US012696083B2

(12) United States Patent
Palanigounder

(10) Patent No.: US 12,696,083 B2
(45) Date of Patent: Jul. 28, 2026

(54) SECURING MEDIA STREAM COMMUNICATIONS

(71) Applicant: QUALCOMM Incorporated, San Diego, CA (US)

(72) Inventor: Anand Palanigounder, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 80 days.

(21) Appl. No.: 17/651,611

(22) Filed: Feb. 18, 2022

(65) Prior Publication Data

US 2023/0269580 A1     Aug. 24, 2023

(51) Int. Cl.
| | |
|---|---|
| *H04W 12/0471* | (2021.01) |
| *H04L 65/1016* | (2022.01) |
| *H04L 65/1104* | (2022.01) |
| *H04W 12/03* | (2021.01) |
| *H04W 12/041* | (2021.01) |

(52) U.S. Cl.
CPC ..... *H04W 12/0471* (2021.01); *H04L 65/1016* (2013.01); *H04L 65/1104* (2022.05); *H04W 12/03* (2021.01); *H04W 12/041* (2021.01)

(58) Field of Classification Search
CPC ............. H04W 12/0471; H04W 12/03; H04W 12/041; H04L 65/1104; H04L 65/1016
See application file for complete search history.

(56) References Cited

U.S. PATENT DOCUMENTS

| | | | | | |
|---|---|---|---|---|---|
| 11,184,331 | B1* | 11/2021 | Berg | ................ | H04N 21/41407 |
| 2009/0220091 | A1* | 9/2009 | Howard | ................. | H04L 9/083 |
| | | | | | 726/3 |

| | | | | | |
|---|---|---|---|---|---|
| 2016/0366707 | A1* | 12/2016 | Sirotkin | ................ | H04W 12/02 |
| 2017/0230428 | A1* | 8/2017 | Paczkowski | ........ | H04L 65/1016 |
| 2018/0124584 | A1 | 5/2018 | Venkatraman et al. | | |
| 2019/0053328 | A1* | 2/2019 | Kunz | ................... | H04W 80/10 |
| 2019/0116162 | A1 | 4/2019 | Xu et al. | | |
| 2020/0119984 | A1 | 4/2020 | Bouvet et al. | | |
| 2022/0060891 | A1* | 2/2022 | Synal | ................ | H04W 12/0471 |

FOREIGN PATENT DOCUMENTS

| | | |
|---|---|---|
| CN | 105530100 A | 4/2016 |

OTHER PUBLICATIONS

Tschofenig, RFC 4764: "The EAP-PSK Protocol: A Pre-Shared Key Extensible Authentication Protocol (EAP) Method", Jan. 2007, Network Working Group, pp. 1-63, obtained from https://datatracker. ietf.org/doc/html/rfc4764 (Year: 2007).*
Zimmermann et al, "RFC6189, ZRTP: Media Path Key Agreement for Unicast Secure RTP", Apr. 2011, pp. 1-115 (Year: 2011).*
International Search Report and Written Opinion—PCT/US2022/ 054282—ISA/EPO—Apr. 21, 2023. 14 pages.

* cited by examiner

*Primary Examiner* — Kevin Bechtel
*Assistant Examiner* — Forrest L Carey
(74) *Attorney, Agent, or Firm* — Polsinelli LLP

(57) ABSTRACT

Embodiments of systems and methods for securing media stream communications involving an Internet Protocol Multimedia Subsystem (IMS) media communication link and a non-IMS media communication link may include establishing a shared key between the UE and a second UE via the IMS media communication link, and using the shared key to protect communications between the UE and the second UE sent via the non-IMS media communication link.

18 Claims, 13 Drawing Sheets

Establish A Shared Key Between The UE And A Second UE Via An IMS Media Communication Link    502

Use The Shared Key To Protect Communications Between The UE And The Second UE Via The Non-IMS Media Communication Link    504

500b

FROM
Block 502
(FIG. 5A)

Use The Shared Key To Encrypt Communications That Are Sent Between The UE And The Second UE Via The IMS Media Communication Link ⌐510

Send The Encrypted Communications Between The UE And The Second UE Via The Non-IMS Media Communication Link ⌐512

500c

500d

500e

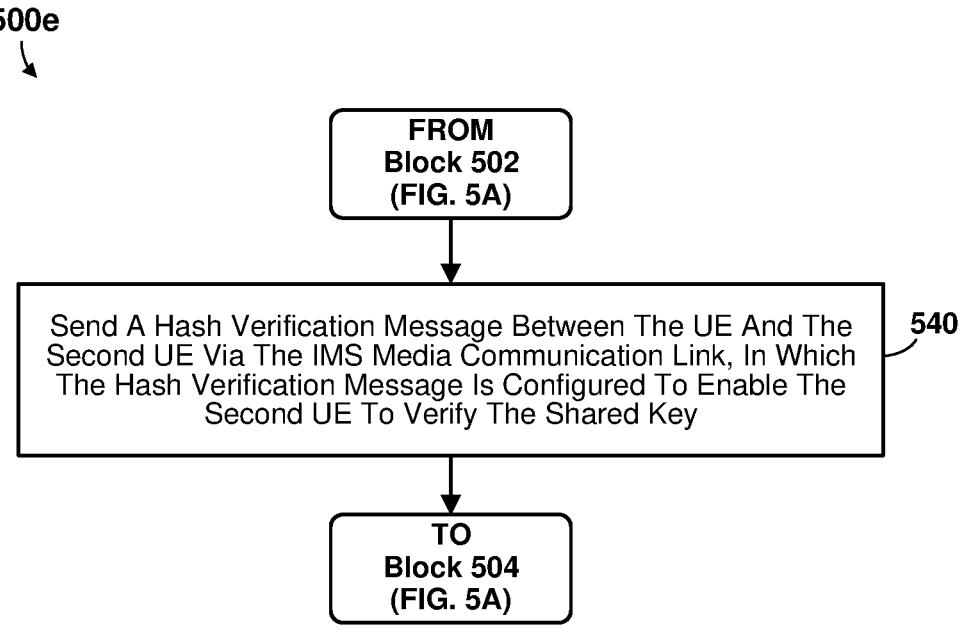

```
      ┌─────────────────┐
      │     FROM        │
      │   Block 502     │
      │   (FIG. 5A)     │
      └─────────────────┘
               │
               ▼
┌──────────────────────────────────────────────────────────┐
│ Send A Hash Verification Message Between The UE And The    │  540
│ Second UE Via The IMS Media Communication Link, In Which   │
│ The Hash Verification Message Is Configured To Enable The  │
│ Second UE To Verify The Shared Key                         │
└──────────────────────────────────────────────────────────┘
               │
               ▼
      ┌─────────────────┐
      │      TO         │
      │   Block 504     │
      │   (FIG. 5A)     │
      └─────────────────┘
```

Apply A Session Initiation Protocol (SIP) Value Known To
The UE And The Second UE To Generate The
Shared Key

550

TO
Block 504
(FIG. 5A)

SECURING MEDIA STREAM COMMUNICATIONS

BACKGROUND

Long Term Evolution (LTE), Fifth Generation (5G) New Radio (NR), and other communication technologies enable improved communication and data services. One such service is voice communication services via an Internet Protocol Multimedia Subsystem (IMS), such as Voice over Long Term Evolution (VoLTE) or Voice over New Radio (VoNR). The quality and performance of IMS voice communication is dependent on wireless channel conditions. One technique for improving the quality and performance of IMS voice communication is to duplicate the information stream carrying voice information over a second, non-IMS communication network, such as a wireless local area network (WLAN) such as a WiFi network with a connection to the Internet. However, the non-IMS communication network carrying the duplicated information stream may be unsecured or untrusted, creating a security risk for the voice communication.

SUMMARY

Various aspects include systems and methods performed by user equipment (UE) for securing media stream communications involving an IMS media communication link and a non-IMS media communication link. In some embodiments, the UE may establish a shared key between the UE and a second UE via the IMS media communication link, and then use the shared key to protect communications between the UE and the second UE via the non-IMS media communication link.

In some aspects, the IMS media communication link may include a cellular communication link. In some aspects, the non-IMS media communication link may include a Wi-Fi communication link. In some aspects, using the shared key to protect communications between the UE and the second UE via the non-IMS media communication link may include using the shared key to encrypt communications that are sent between the UE and the second UE via the IMS media communication link, and sending the encrypted communications between the UE and the second UE via the non-IMS media communication link.

In some aspects, using the shared key to protect communications between the UE and the second UE via the non-IMS media communication link may include using the shared key as a master key to generate one or more encryption keys, and using the generated one or more encryption keys to protect communications between the UE and the second UE via the non-IMS media communication link. In some aspects, establishing a shared key between the UE and the second UE via the IMS media communication link may include determining whether a previously established shared key can be used to protect the communications between the UE and the second UE via the non-IMS media communication link, establishing the shared key between the UE and the second UE via an IMS media communication link in response to determining that the previously established shared key cannot be used to protect the communications between the UE and the second UE via the non-IMS media communication link, and using the previously established shared key to protect communications between the UE and the second UE via the non-IMS media communication link in response to determining that the previously established shared key can be used to protect the communications between the UE and the second UE via the non-IMS media communication link.

Some aspects may include sending a hash verification message between the UE and the second UE via the IMS media communication link, wherein the hash verification message is configured to enable the second UE to verify the shared key. In some aspects, establishing the shared key between the UE and the second UE via the IMS media communication link may include applying a Session Initiation Protocol (SIP) value known to the UE and the second UE to generate the shared key.

Further aspects include a UE having a processor configured to perform one or more operations of any of the methods summarized above. Further aspects include processing devices for use in a UE configured with processor-executable instructions to perform operations of any of the methods summarized above. Further aspects include a non-transitory processor-readable storage medium having stored thereon processor-executable instructions configured to cause a processor of a UE to perform operations of any of the methods summarized above. Further aspects include a UE having means for performing functions of any of the methods summarized above. Further aspects include a system on chip for use in a UE and that includes a processor configured to perform one or more operations of any of the methods summarized above.

BRIEF DESCRIPTION OF THE DRAWINGS

FIG. 2 is a component block diagram illustrating an example computing and wireless modem system suitable for implementing any of the various embodiments.

FIGS. 5B-5F illustrate operations that may be performed as part of the method for securing media stream communications involving an IMS media communication link and a non-IMS media communication link according to some embodiments.

DETAILED DESCRIPTION

Figure 1A:
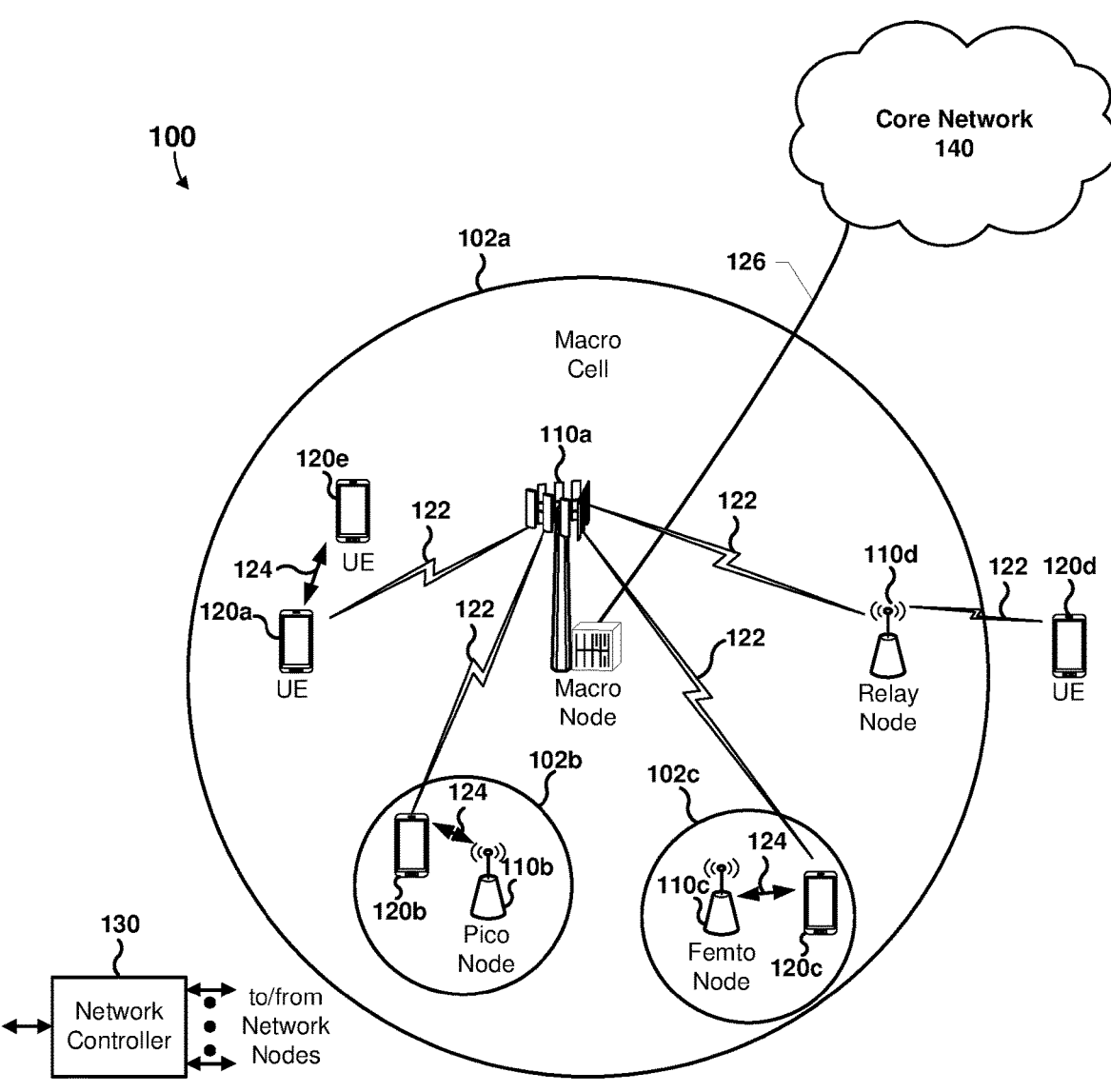
FIG. 1A is a system block diagram illustrating an example communications system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include systems and methods for securing media stream communications involving an Internet Protocol Multimedia Subsystem (IMS) media communication link and a non-IMS media communication link. In various embodiments, a UE may establish communication link via an IMS communication network (e.g., VoLTE, VoNR, etc.) with a second UE. The first UE may use the IMS communication link to establish a secret key, a copy of which is also possessed by the second UE (a shared key). The first UE may use the shared key to protect communications via a second, non-IMS communication link between the first UE and the second UE via a non-IMS communication network, such as a wireless local area network (e.g., WiFi) coupled to the Internet. Then a communication session between the first UE and the second UE may be established in which the IMS communication link that carries an IMS media stream (e.g., a telephone call) and the second, non-IMS communication link that carries a duplicate of the IMS media stream. The security provided to communications via the non-IMS communication link may not be as secure as security provided to communications via the IMS communication link.

Various embodiments improve wireless communications by enabling communications (e.g., an IMS media stream) between UEs via an IMS communication link and a non-IMS communication link that provides robust communication security for the communications via the non-IMS communication link that is at least as secure as the security provided for the communications via the IMS communication link.

The term "user equipment" (UE) is used herein to refer to any one or all of wireless communication devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, wireless router devices, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement Enhanced Data rates for global system for mobile communications (GSM) Evolution (EDGE). In another example, an OFDMA network may implement Evolved UTRA (E-UTRA) (including LTE standards), Institute of Electrical and Electronics Engineers (IEEE) 802.11 (Wi-Fi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

The quality and performance of voice communication services via an Internet Protocol Multimedia Subsystem (IMS), such as Voice over Long Term Evolution (VoLTE) or Voice over New Radio (VoNR), depend on wireless channel conditions. Degradation of NR or LTE wireless communication link conditions may reduce IMS communication performance. One technique for improving the quality and performance of IMS voice communication is to duplicate the media stream carrying voice or other media (e.g., video) information over a second, non-IMS communication link via a second network, such as a WLAN (e.g., WiFi) network with a connection to the Internet. The duplicated media stream sent over the second network may not be carried over a service provider's core network, such as not carried by a service provider's Voice over Wi-Fi (VoWiFi) service accessed via an evolved Packet Data Gateway (ePDG) or other suitable gateway device. While carrying a duplicate media stream over a second communication link can improve the quality and performance of the communication session when the IMS communication link is subject to degradation or interference, security of the communication session may be vulnerable to interception or eavesdropping if the second communication link carrying the duplicated media stream is not secured (i.e., not encrypted).

Various embodiments include methods and UEs configured to perform the methods of securing media stream communications involving an IMS media communication link and a non-IMS media communication link. In some embodiments, the IMS media communication link may include a cellular communication link. In some embodiments, the non-IMS media communication link may include a communication link accessed by a UE via a Wi-Fi network (a "Wi-Fi communication link") coupled to the Internet. In various embodiments, a first UE and a second UE may register with an IMS over a cellular network (e.g., LTE, NR, etc.). IMS communication links are typically encrypted by the service provider's cellular networks, and thus support secure communications. The first UE and the second UE also may establish a separate communication link via a second communication network (e.g., a Wi-Fi network connected to the Internet) by which communications to each UE may be addressed, such as via an Internet protocol (IP) address and port. In some embodiments, a UE's address information may be detected using a suitable protocol such as Session Traversal Utilities for Network Address Translation (STUN), Traversal Using Relays around Network Address Translation (TURN), or another suitable protocol that enables detection of a UE's address information.

In some embodiments, the first UE may establish a shared key between the UE and a second UE via the IMS media communication link. For example, the first UE and the second UE may employ a key agreement protocol such as the Zimmermann Real-time Transport Protocol (ZRTP) to negotiate and establish a shared key for the first UE and the second UE over the IMS media path. In some embodiments, the key agreement protocol may enable a Diffie-Hellman key exchange, and may use a secure transport protocol such as Secure Real-time Transport Protocol (SRTP) to encrypt or integrity protect communications via the IMS media communication link. In some embodiments, the UE may apply a Session Initiation Protocol (SIP) value known to the UE and the second UE to as an additional input to generate the shared key. For example, the UE may use a value or values included in SIP signaling, or a Session Description Protocol (SDP) value or values, as an input to the key derivation function for generating the shared key. In some embodiments, the UE may send a hash verification message between the UE and the second UE via the IMS media communication link. In such embodiments, the hash verification message may be configured to enable the second UE to verify the shared key using the hash received from the first UE.

In some embodiments, the UE may use the shared key to encrypt communications that are sent between the UE and the second UE via the IMS media communication link, and send the encrypted communications between the UE and the second UE via the non-IMS media communication link. In some embodiments, the UE may use the shared key as a master key to generate an encryption key (or encryption keys), and use the generated encryption key (or encryption keys) to protect communications between the UE and the second UE via the non-IMS media communication link. For example, the UE may use the shared key as a Secure Real-time Transport Protocol (SRTP) master key for securing the duplicated communications (e.g., the media stream) sent via the non-IMS media communication link.

In some embodiments the UE may use a previously established shared key to protect (i.e., encrypt or integrity protect or both encrypt and integrity protect) the communications between the UE and the second UE via the non-IMS media communication link. In some embodiments, the UE may use a portion of a previously established shared key to protect the communications between the UE and the second UE via the non-IMS media communication link. For example, according to a protocol that includes key continuity operations, such as ZRTP, the UE may store (e.g., cache) hashed key information of a previously established shared key for use in a later IMS communication session, and may use the stored previous key information as an input to generate a new shared key. In some embodiments, the UE may determine whether a previously established shared key can be used to protect the communications between the UE and the second UE via the non-IMS media communication link. In response to determining that the previously established shared key cannot be used to protect the communications between the UE and the second UE via the non-IMS media communication link, the UE may establish the shared key between the UE and the second UE via an IMS media communication link. In response to determining that the previously established shared key can be used to protect the communications between the UE and the second UE via the non-IMS media communication link, the UE may use the previously established shared key to protect communications between the UE and the second UE via the non-IMS media communication link.

In this manner, the UE may perform operations to secure the duplicated media stream that is conveyed via the non-IMS media communication link. Various embodiments improve the security and the quality and performance of the UE and the communication system by enabling security of a duplicated IMS media stream that is communicated via a non-IMS media communication link.

FIG. 1A is a system block diagram illustrating an example communications system 100 suitable for implementing any of the various embodiments. The communications system 100 may be a 5G New Radio (NR) network, or any other suitable network such as a Long Term Evolution (LTE) network. While FIG. 1A illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of UEs (illustrated as UEs 120a-120e in FIG. 1A). The communications system 100 also may include a number of network devices 110a, 110b, 110c, and 110d and other network entities, such as base stations and network nodes. A network device is an entity that communicates with UEs, and in various embodiments may be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like. In various communication network implementations or architectures, a network device may be implemented as an aggregated base station, as a disaggregated base station, an integrated access and backhaul (IAB) node, a relay node, a sidelink node, etc., such as a virtualized Radio Access Network (vRAN) or Open Radio Access Network (O-RAN). Also, in various communication network implementations or architectures, a network device (or network entity) may be implemented in an aggregated or monolithic base station architecture, or alternatively, in a disaggregated base station architecture, may include one or more of a Centralized Unit (CU), a Distributed Unit (DU), a Radio Unit (RU), a near-real time (RT) RAN intelligent controller (RIC), or a non-real time RIC. Each network device may provide communication coverage for a particular geographic area. In 3GPP, the term "cell" can refer to a coverage area of a network device, a network device subsystem serving this coverage area, or a combination thereof, depending on the context in which the term is used. The core network 140 may be any type core network, such as an LTE core network (e.g., an evolved packet core (EPC) network), 5G core network, etc.

A network device 110a-110d may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A network device for a macro cell may be referred to as a macro node or macro base station. A network device for a pico cell may be referred to as a pico node or a pico base station. A network device for a femto cell may be referred to as a femto node, a femto base station, a home node or home network device. In the example illustrated in FIG. 1A, a network device 110a may be a macro node for a macro cell 102a, a network device 110b may be a pico node for a pico cell 102b, and a network device 110c may be a femto node for a femto cell 102c. A network device 110a-110d may support one or multiple (for example, three) cells. The terms "network device," "network node," "eNB," "base station," "NR BS," "gNB," "TRP," "AP," "node B," "5G NB," and "cell" may be used interchangeably herein.

In some examples, a cell may not be stationary, and the geographic area of the cell may move according to the location of a network device, such as a network node or mobile network device. In some examples, the network devices 110a-110d may be interconnected to one another as well as to one or more other network devices (e.g., base stations or network nodes (not illustrated)) in the communications system 100 through various types of backhaul interfaces, such as a direct physical connection, a virtual network, or a combination thereof using any suitable transport network The network device 110a-110d may communicate with the core network 140 over a wired or wireless communication link 126. The UE 120a-120e may communicate with the network node 110a-110d over a wireless communication link 122. The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay network device 110d). A relay station is an entity that can receive a transmission of data from an upstream station (for example, a network device or a UE) and send a transmission of the data to a downstream station (for example, a UE or a network device). A relay station also may be a UE that can relay transmissions for other UEs. In the example illustrated in FIG. 1A, a relay station 110d may communicate with macro the network device 110a and the UE 120d in order to facilitate communication between the network device 110a and the UE 120d. A relay station also may be referred to as a relay network device, a relay base station, a relay, etc.

The communications system 100 may be a heterogeneous network that includes network devices of different types, for example, macro network devices, pico network devices, femto network devices, relay network devices, etc. These different types of network devices may have different transmit power levels, different coverage areas, and different impacts on interference in communications system 100. For example, macro nodes may have a high transmit power level (for example, 5 to 40 Watts) whereas pico network devices, femto network devices, and relay network devices may have lower transmit power levels (for example, 0.1 to 2 Watts).

A network controller 130 may couple to a set of network devices and may provide coordination and control for these network devices. The network controller 130 may communicate with the network devices via a backhaul. The network devices also may communicate with one another, for example, directly or indirectly via a wireless or wireline backhaul.

The UEs 120a, 120b, 120c may be dispersed throughout communications system 100, and each UE may be stationary or mobile. A UE also may be referred to as an access terminal, a terminal, a mobile station, a subscriber unit, a station, wireless device, etc.

A macro network device 110a may communicate with the communication network 140 over a wired or wireless communication link 126. The UEs 120a, 120b, 120c may communicate with a network device 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using Time Division Duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per UE. Multi-layer transmissions with up to 2 streams per UE may be supported.

Aggregation of multiple cells may be supported with up to eight serving cells. Alternatively, NR may support a different air interface, other than an OFDM-based air interface.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a network device, another device (for example, remote device), or some other entity. A wireless computing platform may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. The UE 120a-120e may be included inside a housing that houses components of the UE 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an EPC network) in a 5G NSA network. Other example network configurations may include a 5G standalone (SA) network in which a 5G/NR RAN connects to a 5G core network.

In some implementations, two or more UEs 120a-120e (for example, illustrated as the UE 120a and the UE 120e) may communicate directly using one or more sidelink channels 124 (for example, without using a network node 110a-110d as an intermediary to communicate with one another). For example, the UEs 120a-120e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120a-120e may perform scheduling operations, resource selection operations, as well as other operations described elsewhere herein as being performed by the network node 110a-110d.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or components) performing base station functionality, may be implemented in an aggregated or disaggregated architecture. For example, a base station (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or as a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CUs, DUs and RUs also can be implemented as virtual units, referred to as a virtual central unit (VCU), a virtual distributed unit (VDU), or a virtual radio unit (VRU).

Base station-type operations or network design may consider aggregation characteristics of base station functionality. For example, disaggregated base stations may be utilized in an integrated access backhaul (IAB) network, an open radio access network (O-RAN) (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 1B:
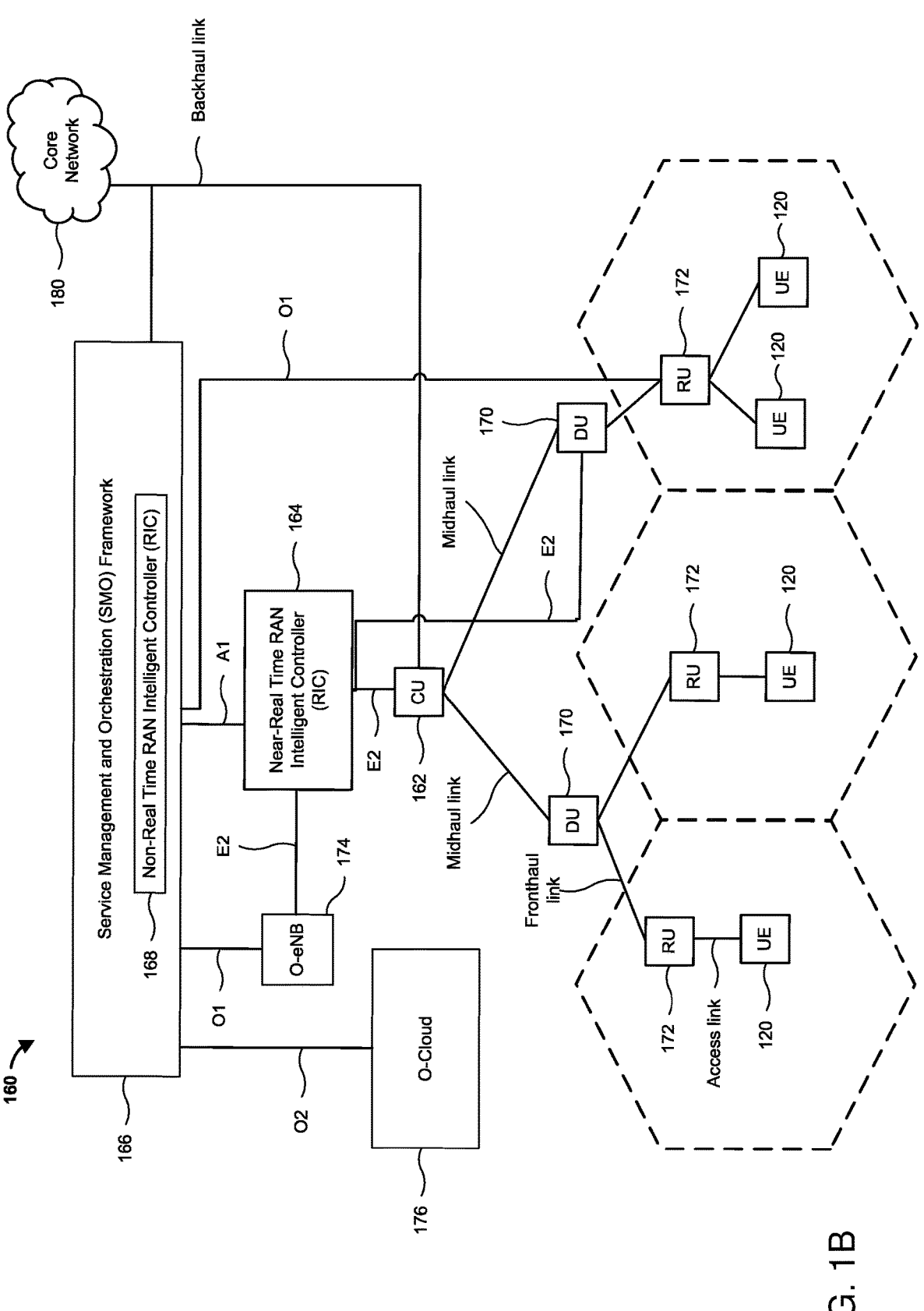
FIG. 1B is a system block diagram illustrating an example disaggregated base station architecture suitable for implementing any of the various embodiments.

FIG. 1B is a system block diagram illustrating an example disaggregated base station 160 architecture suitable for implementing any of the various embodiments. With reference to FIGS. 1A and 1B, the disaggregated base station 160 architecture may include one or more central units (CUs) 162 that can communicate directly with a core network 180 via a backhaul link, or indirectly with the core network 180 through one or more disaggregated base station units, such as a Near-Real Time (Near-RT) RAN Intelligent Controller (RIC) 164 via an E2 link, or a Non-Real Time (Non-RT) RIC 168 associated with a Service Management and Orchestration (SMO) Framework 166, or both. A CU 162 may communicate with one or more distributed units (DUs) 170 via respective midhaul links, such as an F1 interface. The DUs 170 may communicate with one or more radio units (RUs) 172 via respective fronthaul links. The RUs 172 may communicate with respective UEs 120 via one or more radio frequency (RF) access links. In some implementations, the UE 120 may be simultaneously served by multiple RUs 172.

Each of the units (i.e., CUs 162, DUs 170, RUs 172), as well as the Near-RT RICs 164, the Non-RT RICs 168 and the SMO Framework 166, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 162 may host one or more higher layer control functions. Such control functions may include the radio resource control (RRC), packet data convergence protocol (PDCP), service data adaptation protocol (SDAP), or the like. Each control function may be implemented with an interface configured to communicate signals with other control functions hosted by the CU 162. The CU 162 may be configured to handle user plane functionality (i.e., Central Unit-User Plane (CU-UP)), control plane functionality (i.e., Central Unit-Control Plane (CU-CP)), or a combination thereof. In some implementations, the CU 162 can be logically split into one or more CU-UP units and one or more CU-CP units. The CU-UP unit can communicate bidirectionally with the CU-CP unit via an interface, such as the E1 interface when implemented in an O-RAN configuration. The CU 162 can be implemented to communicate with DUs 170, as necessary, for network control and signaling.

The DU 170 may correspond to a logical unit that includes one or more base station functions to control the operation of one or more RUs 172. In some aspects, the DU 170 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 170 may further host one or more low PHY layers. Each layer (or module) may be implemented with an interface configured to communicate signals with other layers (and modules) hosted by the DU 170, or with the control functions hosted by the CU 162.

Lower-layer functionality may be implemented by one or more RUs 172. In some deployments, an RU 172, controlled by a DU 170, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 172 may be implemented to handle over the air (OTA) communication with one or more UEs 120. In some implementations, real-time and non-real-time aspects of control and user plane communication with the RU(s) 172 may be controlled by the corresponding DU 170. In some scenarios, this configuration may enable the DU(s) 170 and the CU 162 to be implemented in a cloud-based RAN architecture, such as a vRAN architecture.

The SMO Framework 166 may be configured to support RAN deployment and provisioning of non-virtualized and virtualized network elements. For non-virtualized network elements, the SMO Framework 166 may be configured to support the deployment of dedicated physical resources for RAN coverage requirements, which may be managed via an operations and maintenance interface (such as an O1 interface). For virtualized network elements, the SMO Framework 166 may be configured to interact with a cloud computing platform (such as an open cloud (O-Cloud) 176) to perform network element life cycle management (such as to instantiate virtualized network elements) via a cloud computing platform interface (such as an O2 interface). Such virtualized network elements can include, but are not limited to, CUs 162, DUs 170, RUs 172 and Near-RT RICs 164. In some implementations, the SMO Framework 166 may communicate with a hardware aspect of a 4G RAN, such as an open eNB (O-eNB) 174, via an O1 interface. Additionally, in some implementations, the SMO Framework 166 may communicate directly with one or more RUs 172 via an O1 interface. The SMO Framework 166 also may include a Non-RT RIC 168 configured to support functionality of the SMO Framework 166.

The Non-RT RIC 168 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 164. The Non-RT RIC 168 may be coupled to or communicate with (such as via an A1 interface) the Near-RT RIC 164. The Near-RT RIC 164 may be configured to include a logical function that enables near-real-time control and optimization of RAN elements and resources via data collection and actions over an interface (such as via an E2 interface) connecting one or more CUs 162, one or more DUs 170, or both, as well as an O-eNB, with the Near-RT RIC 164.

In some implementations, to generate AI/ML models to be deployed in the Near-RT RIC 164, the Non-RT RIC 168 may receive parameters or external enrichment information from external servers. Such information may be utilized by the Near-RT RIC 164 and may be received at the SMO Framework 166 or the Non-RT RIC 168 from non-network data sources or from network functions. In some examples, the Non-RT RIC 168 or the Near-RT RIC 164 may be config- ured to tune RAN behavior or performance. For example, the Non-RT RIC 168 may monitor long-term trends and patterns for performance and employ AI/ML models to perform corrective actions through the SMO Framework 166 (such as reconfiguration via 01) or via creation of RAN management policies (such as A1 policies).

Figure 2:
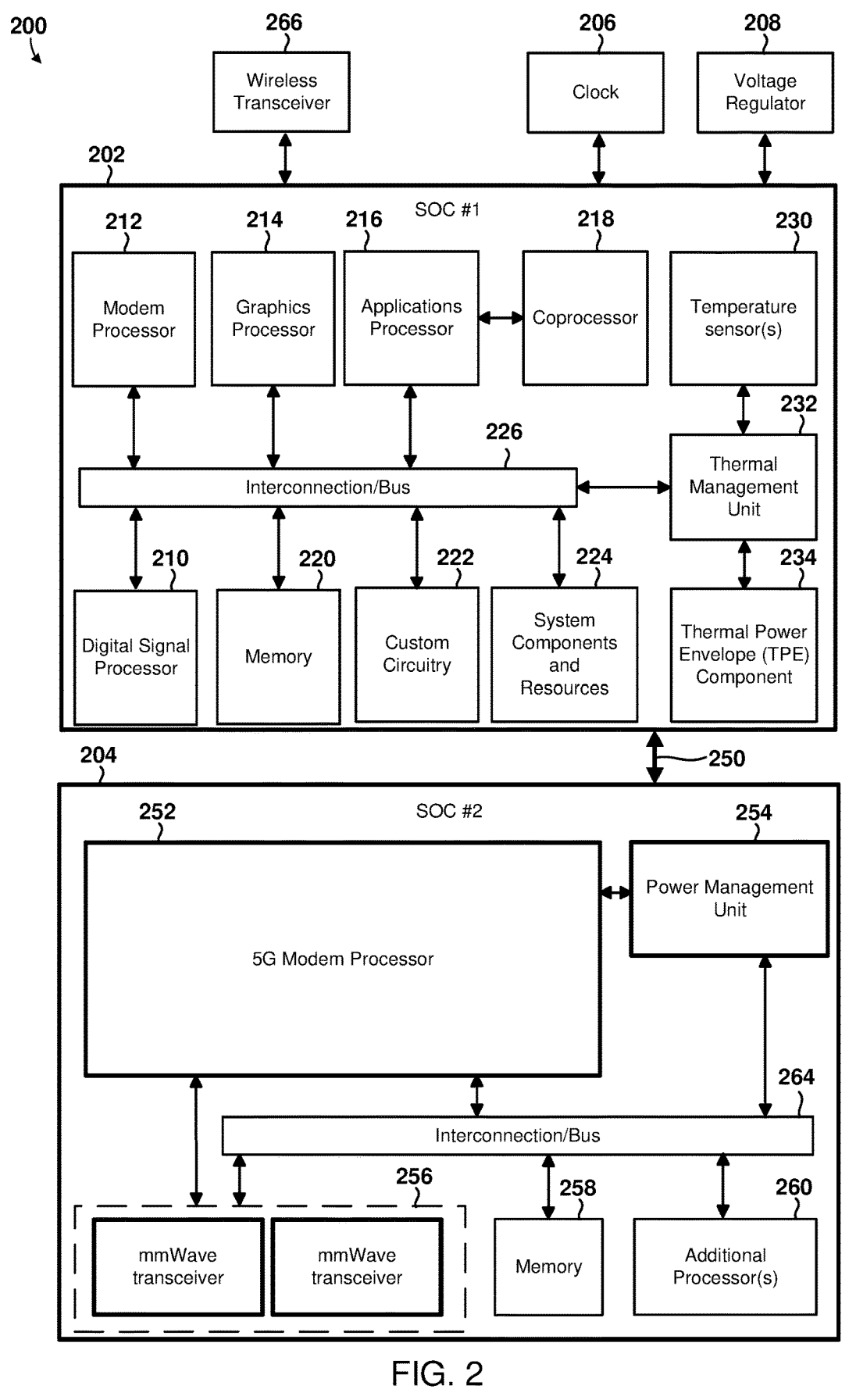

FIG. 2 is a component block diagram illustrating an example computing and wireless modem system 200 suit- able for implementing any of the various embodiments. Various embodiments may be implemented on a number of single processor and multiprocessor computer systems, including a system-on-chip (SOC) or system in a package (SIP).

With reference to FIGS. 1A-2, the illustrated example computing system 200 (which may be a SIP in some embodiments) includes a two SOCs 202, 204 coupled to a clock 206, a voltage regulator 208, and a wireless trans- ceiver 266 configured to send and receive wireless commu- nications via an antenna (not shown) to/from a UE (e.g., 120a-120e) or a network device (e.g., 110a-110d). In some implementations, the first SOC 202 may operate as central processing unit (CPU) of the UE that carries out the instruc- tions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), and/or very high frequency short wave length (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuity 222, system components and resources 224, an interconnection/bus mod- ule 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional pro- cessors 260, such as an applications processor, packet pro- cessor, etc.

Each processor 210, 212, 214, 216, 218, 252, 260 may include one or more cores, and each processor/core may perform operations independent of the other processors/ cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchro- nous or heterogeneous processor cluster architecture, etc.).

The first and second SOC 202, 204 may include various system components, resources and custom circuitry for managing sensor data, analog-to-digital conversions, wire- less data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar compo- nents used to support the processors and software clients running on a UE. The system components and resources 224 and/or custom circuitry 222 also may include circuitry to interface with peripheral devices, such as cameras, elec- tronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/ bus module 226, 250, 264 may include an array of recon- figurable logic gates and/or implement a bus architecture (such as CoreConnect, AMBA, etc.). Communications may be provided by advanced interconnects, such as high-per- formance networks-on chip (NoCs).

The first and/or second SOCs 202, 204 may further include an input/output module (not illustrated) for commu- nicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combina- tion thereof.

Figure 3:
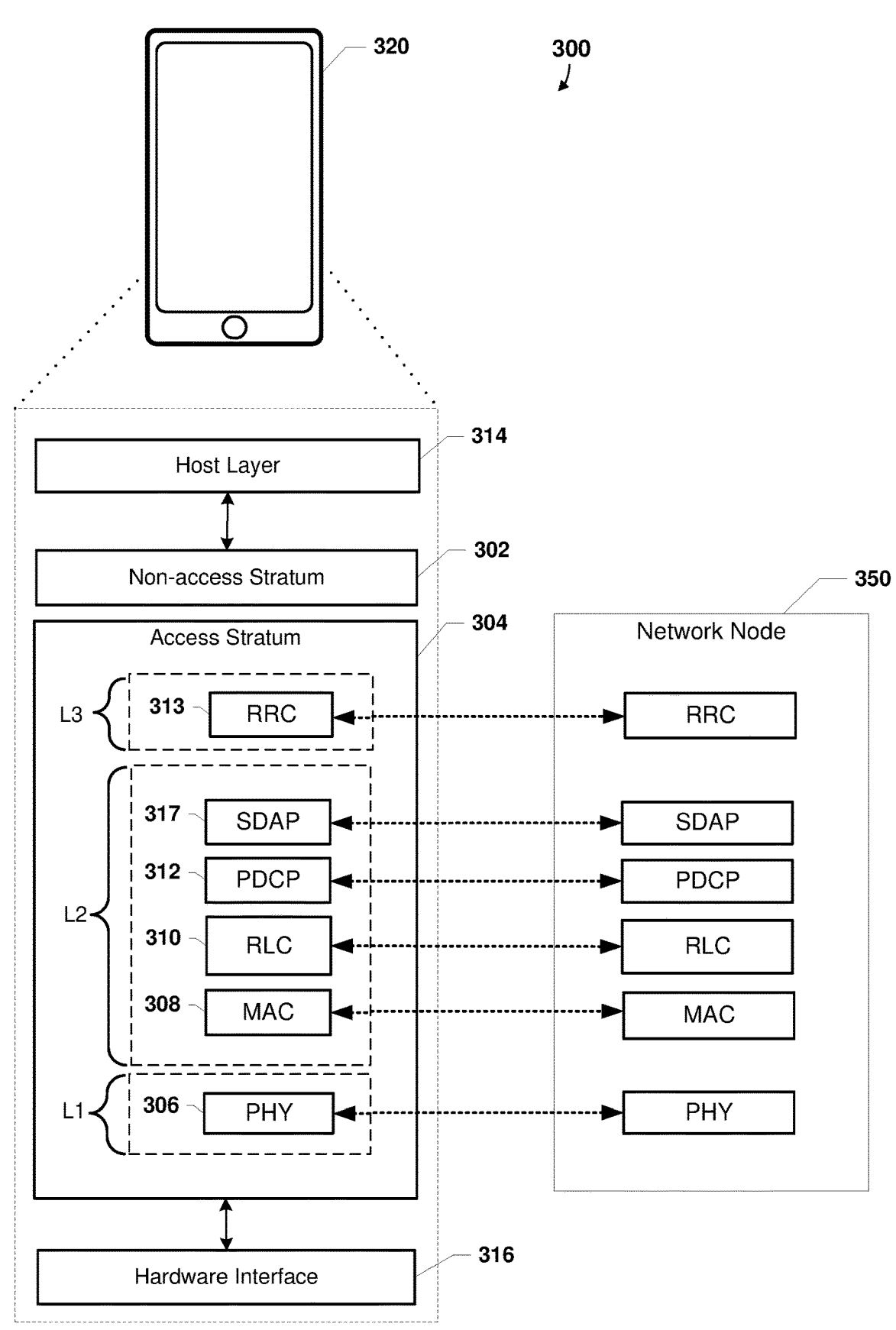
FIG. 3 is a component block diagram illustrating a software architecture including a radio protocol stack for the user and control planes in wireless communications suitable for implementing any of the various embodiments.

FIG. 3 is a component block diagram illustrating a soft- ware architecture 300 including a radio protocol stack for the user and control planes in wireless communications suitable for implementing any of the various embodiments. With reference to FIGS. 1A-3, the UE 320 may implement the software architecture 300 to facilitate communication between a UE 320 (e.g., the UE 120a-120e, 200) and the network device 350 (e.g., the network device 110a-110d) of a communication system (e.g., 100). In various embodi- ments, layers in software architecture 300 may form logical connections with corresponding layers in software of the network device 350. The software architecture 300 may be distributed among one or more processors (e.g., the proces- sors 212, 214, 216, 218, 252, 260). While illustrated with respect to one radio protocol stack, in a multi-SIM (sub- scriber identity module) UE, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the UE (such as SIM(s) 204) and its core network 140. The AS 304 may include functions and protocols that support communication between a SIM(s) (such as SIM(s)

204) and entities of supported access networks (such as a network device, network node, RU, base station, etc.). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface via a wireless transceiver (e.g., 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the UE 320 and the network node 350 over the physical layer 306. In some implementations, Layer 2 may include a media access control (MAC) sublayer 308, a radio link control (RLC) sublayer 310, and a packet data convergence protocol (PDCP) 312 sublayer, and a Service Data Adaptation Protocol (SDAP) 317 sublayer, each of which form logical connections terminating at the network node 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions including broadcasting system information, paging, and establishing and releasing an RRC signaling connection between the UE 320 and the network node 350.

In various embodiments, the SDAP sublayer 317 may provide mapping between Quality of Service (QoS) flows and data radio bearers (DRBs). In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the UE 320. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as Internet Protocol (IP) layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

In various network implementations or architectures, in the network device 350 the different logical layers 308-317 may be implemented in an aggregated or monolithic base station architecture, or alternatively, in a disaggregated network device architecture, and various logical layers may implemented in one or more of a CU, a DU, an RU, a Near-RT RAN Intelligent Controller (RIC), or a Non-Real Time (Non-RT) RIC. Further, the network device 350 may be implemented as an aggregated base station, as a disaggregated base station, an integrated access and backhaul (IAB) node, a relay node, a sidelink node, etc.

Figure 4:
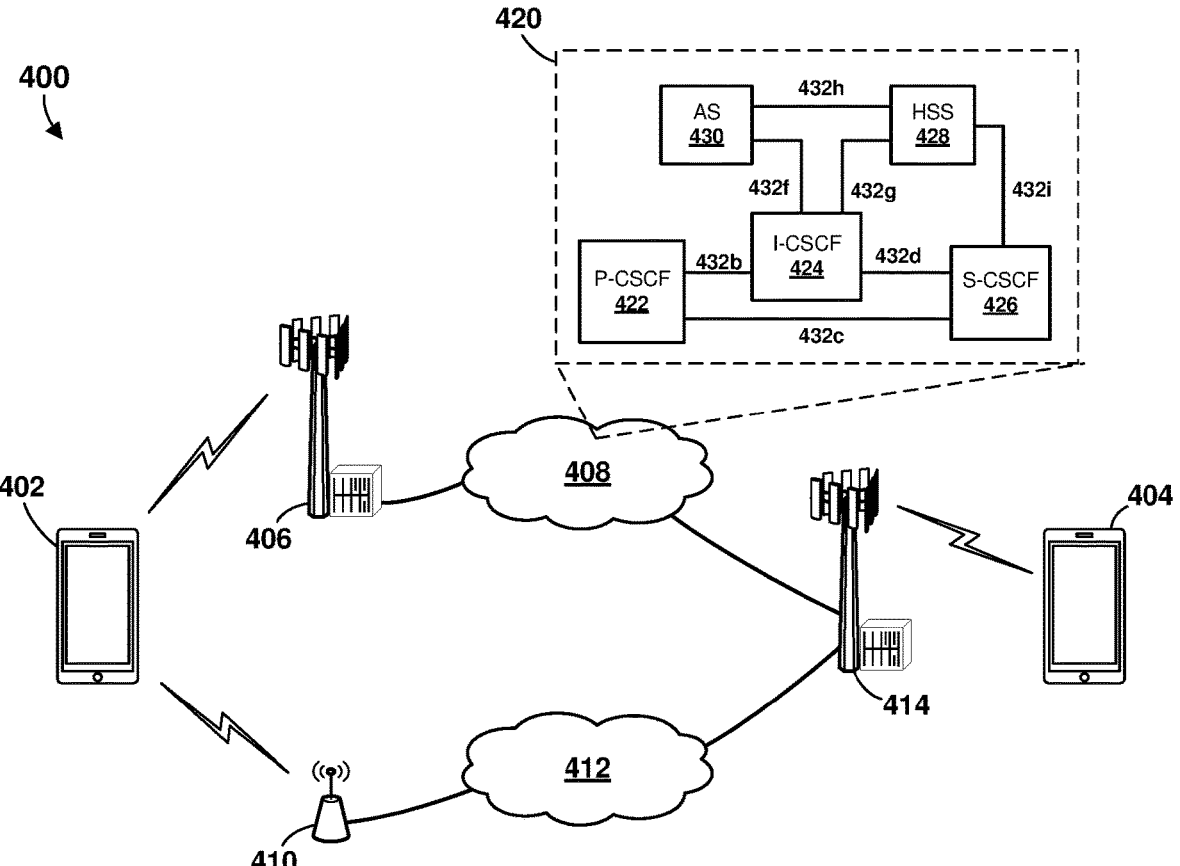
FIG. 4 is a component block diagrams illustrating a system configured for securing media stream communications involving an Internet Protocol Multimedia Subsystem (IMS) media communication link and a non-IMS media communication

FIG. 4 is a component block diagrams illustrating a system 400 configured for securing media stream communications involving an Internet Protocol Multimedia Subsystem (IMS) media communication link and a non-IMS media communication link suitable for implementing any of the various embodiments. With reference to FIGS. 1A-4, system 400 may include a first UE 402 and a second UE 404 (e.g., 120*a*-120*e*, 200, 320), and network devices 406, 410, and 414 (e.g., 110*a*-110*d*, 200, 350). The network devices 406 and 414 may communicate with a first communication network 408 via wired or wireless communication links. The network devices 410 and 414 may communicate with a second communication network 412 via wired or wireless communication links.

The first communication network 408 may include an IP Multimedia Subsystem (IMS) 420 configured to support and provide IP multimedia services. The IMS 420 may include a call session control function (CSCF). In some embodiments of the IMS 420, the CSCF may include a Proxy Call Session Control Function (P-CSCF) 422, an Interrogating CSCF (I-CSCF) 424, a Serving CSCF (S-CSCF 426), a Home Subscriber Server (HSS) 428, and an application server (AS) 430, that are configured to perform various functions of the CSCF. In some embodiments, the P-CSCF 422, I-CSCF 424, S-CSCF 426, HSS 428, and AS 430 may be instantiated on one or more computing devices (e.g., one or multiple servers) in a communication network (e.g., 140). In some embodiments, each of the P-CSCF 422, I-CSCF 424, S-CSCF 426, HSS 428, and AS 430 may communicate with one another as illustrated via a communication link such as an interface 432*b*, 432*c*, 432*d*, 432*f*, 432*g*, 432*h*, and 432*i*.

The P-CSCF 422 may be configured to perform an edge access function to receive a request from a UE (e.g., 402, 404) for services from the IMS 420. The P-CSCF 422 may be configured to function as a proxy by accepting such a request and forwarding the request a network control function or entity configured to receive and process the request. In some embodiments, the request may include a registration request. In some embodiments, the request may include an invitation for a multimedia session. In some embodiments, the P-CSCF 422 may provide updates to the S-CSCF 426 on a network access utilized by the UE 402, 404. In some embodiments, the P-CSCF 422 may be configured to perform a Policy and Charging Rules Function (PCRF), and to maintain a secure communication link with the UE 402, 404.

In some embodiments, the I-CSCF 424 may be configured to determine or select an S-CSCF 426 to manage an IMS session requested by the UE 402, 404. As further described herein, the I-CSCF 424 may be configured to obtain a request for an address of the S-CSCF 426 (e.g., a domain name) from the HSS 428 during a process of registration or re-registration of the UE 402, 404 with the IMS 420. In some embodiments, the I-CSCF 424 may be configured to route messages (e.g., SIP signaling) to the selected S-CSCF 426, e.g., during such registration or re-registration process, to assign the S-CSCF 426 to the UE 402, 404. In some embodiments, I-CSCF 424 may be configured to query the HSS 428 to determine information associated with the UE 402, 404, which may include subscriber location information, as further described below.

In some embodiments, the S-CSCF 426 may be configured to perform operations as the primary node in the IMS 420 responsible for session control on behalf of the UE 402, 404. In some embodiments, the I-CSCF 424 may assign the S-CSCF 426 to the UE 402, 404 as part of an IMS registration procedure. In some embodiments, the S-CSCF 426 may obtain and/or receive a subscriber profile that is associated with the UE 402, 404 from the HSS 428, such as part of the IMS registration procedure for the UE 402, 404. In some embodiments, the S-CSCF 426 may determine an appropriate AS 430 for a service requested by the UE 402, 404, and forward (conduct) appropriate signaling to the AS 430.

In some embodiments, the HSS 428 may be configured to perform operations as a master database for the UE 402, 404, and store information such as a subscriber profile associated with the UE 402, 404. In some embodiments, subscriber-related information stored in the HSS 428 may include user identification, security, location and subscription profile information. In some embodiments, the HSS 428 also may store subscriber location information associated with the UE 402, 404.

In various embodiments, the UEs 402 and 404 may register with the IMS 420. The UE 402 may send a call request message to the IMS 420, and the IMS 420 may perform operations to establish an IMS communication session via the first communication network 408 between the UE 402 and the UE 404. The IMS communication session via the first communication network 408 may be referred to as an IMS media communication link. In some embodiments, the IMS media communication link may include a cellular communication link that is supported by the devices and infrastructure of a cellular communication network. The UE 402 and the UE 404 also may each establish a communication link with the second communication network 412, e.g., via the network device 410 or the network device 414, respectively. Communications between the UE 402 and the UE 404 via the second communication network 412 may be referred to as a non-IMS communication link. In some embodiments, the non-IMS media communication link may include a Wi-Fi communication link that is accessed by at least one of the UEs via a Wi-Fi communication link (e.g., the UE 402 via the network device 410).

Figure 5A:
FIG. 5A is a process flow diagram illustrating a method performed by a processor of a UE for securing media stream communications involving an IMS media communication link and a non-IMS media communication link according to various embodiments.
Figure 5A:
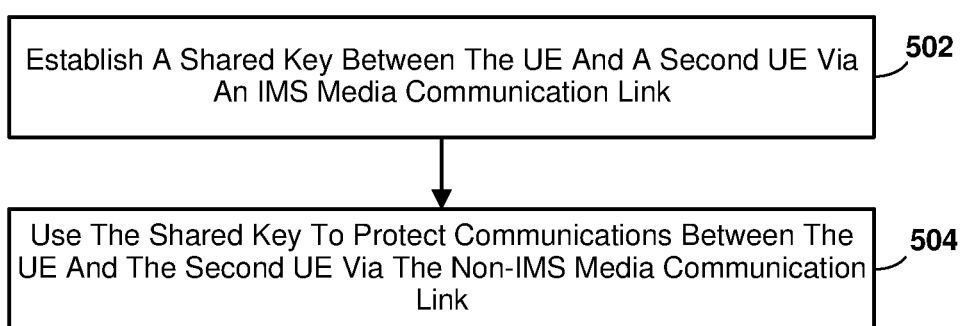

FIG. 5A is a process flow diagram illustrating a method 500a performed by a processor of a UE for securing media stream communications involving an IMS media communication link and a non-IMS media communication link according to various embodiments. With reference to FIGS. 1A-5A, the operations of the method 500a may be performed by a processor (such as the processor 210, 212, 214, 216, 218, 252, 260) of a UE (such as the UE 120a-120e, 200, 320, 402, 404).

In block 502, the processor may establish a shared key between the UE and a second UE (e.g., 404) via the IMS media communication link. In some embodiments, IMS media communication link may be or include a cellular communication link. In some embodiments, the processor may employ a key agreement protocol such as ZRTP or a Diffie-Hellman key exchange to negotiate and establish a shared key for the UE and the second UE. In some embodiments, the key agreement protocol may enable a key exchange (e.g., a Diffie-Hellman key exchange), and may use a secure transport protocol such as Secure Real-time Transport Protocol (SRTP) to encrypt communications via the IMS media communication link. Means for performing functions of the operations in block 502 may include the processor (e.g., 210, 212, 214, 216, 218, 252, 260) and the wireless transceiver (e.g., 266).

In block 504, the processor may use the shared key to protect communications between the UE and the second UE via the non-IMS media communication link. In some embodiments the processor may use the shared key to encrypt communications exchanged between the UE and the second UE via the non-IMS media communication link. In some embodiments the processor of the UE and the second UE may use the shared key to generate another shared key, and use the generated another shared key to encrypt or integrity protect communications between the UE and the second UE via the non-IMS media communication link. In some embodiments the non-IMS media communication link may include a Wi-Fi communication link. Means for performing functions of the operations in block 504 may include the processor (e.g., 210, 212, 214, 216, 218, 252, 260) and the wireless transceiver (e.g., 266).

FIGS. 5B-5F illustrate operations 500b-500f that may be performed as part of the method 500a for securing media stream communications involving an IMS media communication link and a non-IMS media communication link according to various embodiments. With reference to FIGS. 1A-5F, the operations 500b-500f may be performed by a processor (such as the processor 210, 212, 214, 216, 218, 252, 260) of a UE (such as the UE 120a-120e, 200, 320, 402, 404).

Figure 5B:
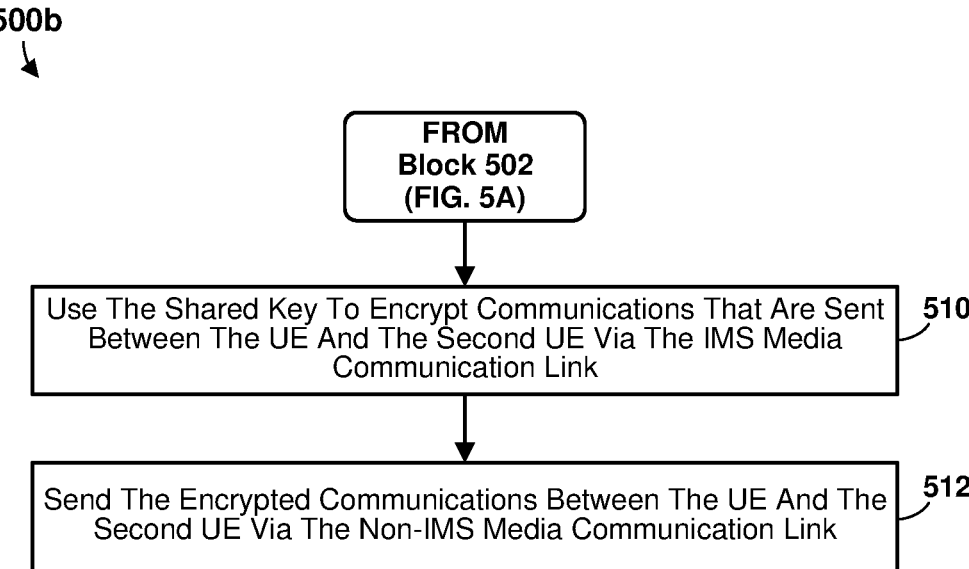

Referring to FIG. 5B, after the processor establishes a shared key between the UE and a second UE via the IMS media communication link in block 502 as described, the processor may use the shared key to encrypt communications that are sent between the UE and the second UE via the IMS media communication link in block 510. Means for performing functions of the operations in block 510 may include the processor (e.g., 210, 212, 214, 216, 218, 252, 260).

In block 512, the processor may send the encrypted communications between the UE and the second UE via the non-IMS media communication link. For example, the processor may send the encrypted communications from the UE 402 to the UE 404 via the communication network 412. Means for performing functions of the operations in block 512 may include the processor (e.g., 210, 212, 214, 216, 218, 252, 260) and the wireless transceiver (e.g., 266).

Figure 5C:
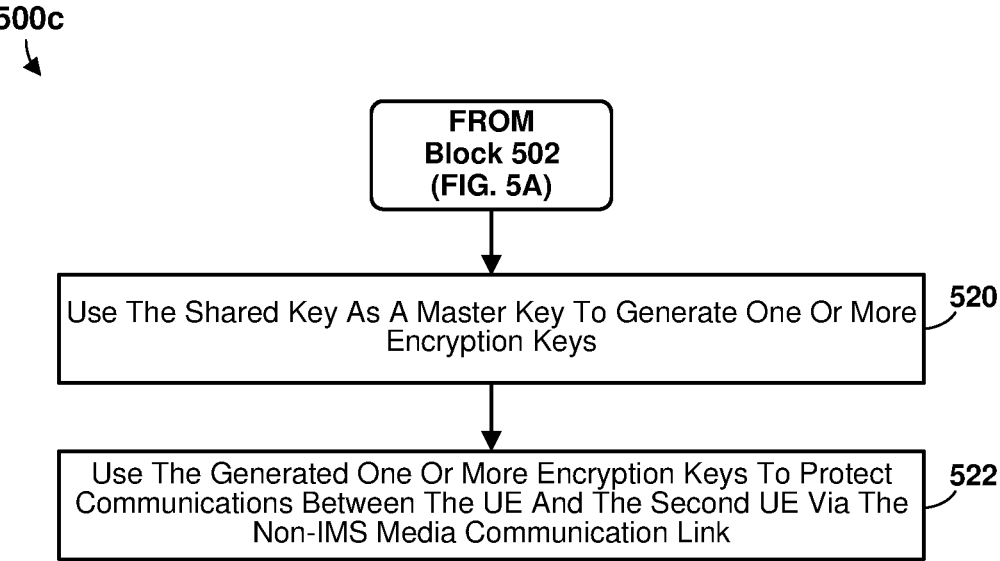

Referring to FIG. 5C, after the processor establishes a shared key between the UE and a second UE via the IMS media communication link in block 502 as described, the processor may use the shared key as a master key to generate one or more encryption keys in block 520. For example, the processor may use the shared key as a master key to generate one or more encryption keys using an algorithm that is also used by the second UE to generate the same one or more encryption keys, thereby generating shared one or more encryption keys. Means for performing functions of the operations in block 520 may include the processor (e.g., 210, 212, 214, 216, 218, 252, 260).

In block 522, the processor may use the generated one or more encryption keys to protect communications between the UE and the second UE via the non-IMS media communication link. For example, the processor may use the generated one or more encryption keys to protect (e.g., encrypt) communications between the UE and the second UE via the non-IMS media communication link. Means for performing functions of the operations in block 504 may include the processor (e.g., 210, 212, 214, 216, 218, 252, 260) and the wireless transceiver (e.g., 266).

Figure 5D:
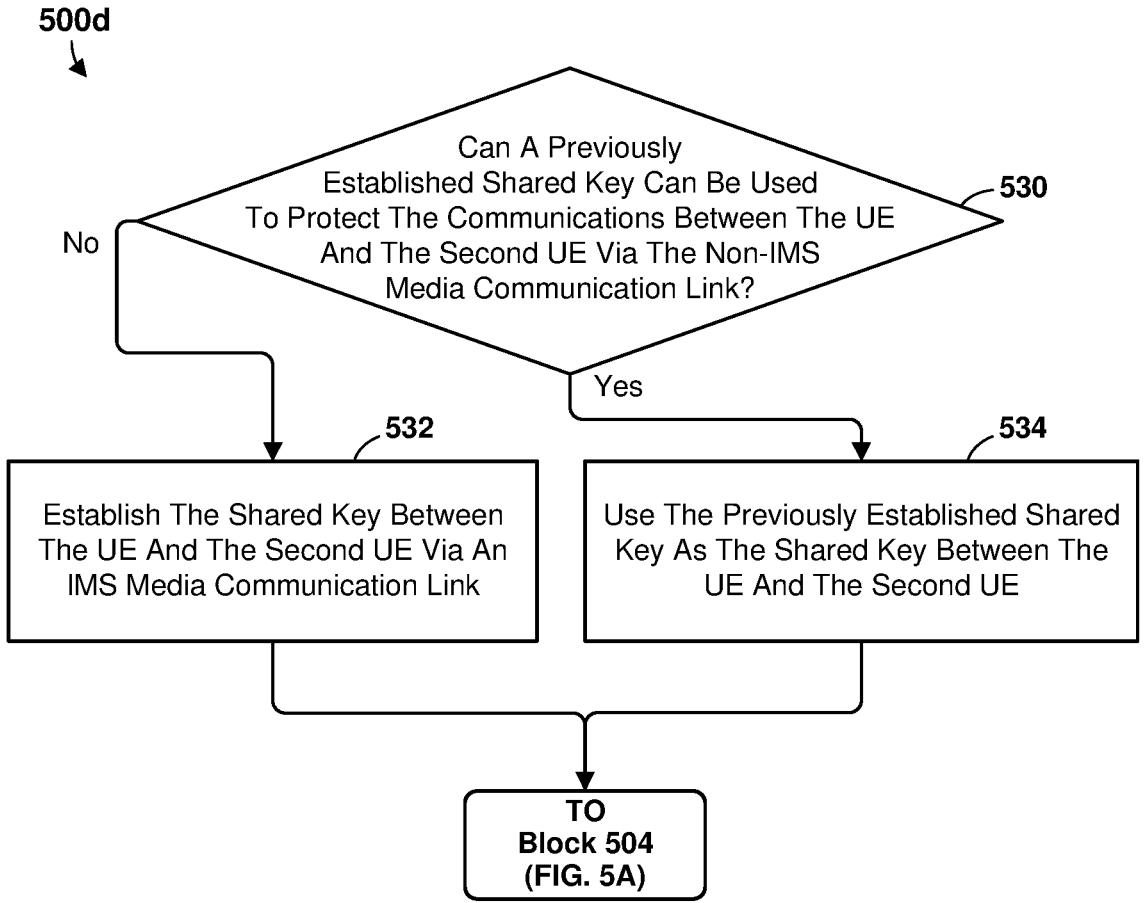

Referring to FIG. 5D, in determination block 530, the processor may determine whether a previously established key between the UE and the second UE (i.e., a previously established shared key) can be used to protect the communications between the UE and the second UE via the non-IMS media communication link. For example, according to a protocol that includes key continuity operations, such as ZRTP, the UE may store (e.g., cache) hashed key information of a previously established shared key for use in a later IMS communication session, and may use the stored previous key information to generate a new shared key. Means for performing functions of the operations in determination block 530 may include the processor (e.g., 210, 212, 214, 216, 218, 252, 260).

In response to determining that the previously established shared key cannot be used to protect the communications between the UE and the second UE via the non-IMS media communication link (i.e., determination block 530="No"), the processor may establish (e.g., generate, determine) the shared key between the UE and the second UE via an IMS media communication link in block 532. Means for performing functions of the operations in block 532 may include the processor (e.g., 210, 212, 214, 216, 218, 252, 260).

In response to determining that the previously established shared key can be used to protect the communications between the UE and the second UE via the non-IMS media communication link (i.e., determination block 530="Yes"), the processor may use the previously established shared key as the shared key (i.e., the key shared between the UE and the second UE) for protecting communications via the non-IMS media communication link in block 534. Means for performing functions of the operations in block 534 may include the processor (e.g., 210, 212, 214, 216, 218, 252, 260).

The processor may then use the shared key to protect communications between the UE and the second UE via the non-IMS media communication link in block 504 of the method 500a as described. As described with reference to FIGS. 5B and 5C, the processor may use the previously established shared key to encrypt communications or generate another shared key to encrypt communications.

Referring to FIG. 5E, after the processor establishes a shared key between the UE and a second UE via the IMS media communication link in block 502 as described, the processor may send a hash verification message between the UE and the second UE via the IMS media communication link, wherein the hash verification message is configured to enable the second UE to verify the shared key in block 540. For example, the UE and the second UE may each independently generate a hash value of the shared key. The processor may send the hash value generated by the processor of the (first) UE to the second UE, to enable the second UE to verify that the hash value of the first UE matched the hash value of the second UE. Means for performing functions of the operations in block 540 may include the processor (e.g., 210, 212, 214, 216, 218, 252, 260) and the wireless transceiver (e.g., 266).

The processor may then use the shared key to protect communications between the UE and the second UE via the non-IMS media communication link in block 504, as described.

Figure 5F:
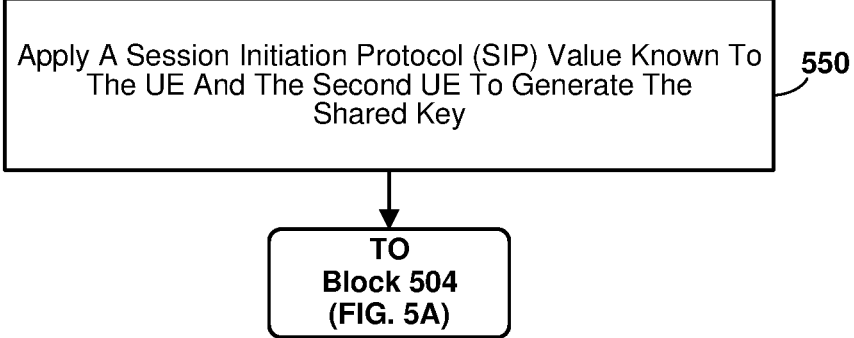

Referring to FIG. 5F, the processor may apply a Session Initiation Protocol (SIP) value known to the UE and the second UE to generate the shared key. For example, the processor may use one or more values of an attribute in SIP signaling, or of an SDP attribute, that is known to both the UE and the second UE. In some embodiments, the one or more SIP attribute values or SDP attribute values may not be exchanged over the IMS media path, and cannot be intercepted by an eavesdropping device. Examples of the SIP value known to the UE and the second UE may include a phone number (or other address information) of the UE, a phone number (or other address information) of the second UE, one or more CODECs supported by the first UE and the second UE, and/or one or more other SIP values. Means for performing functions of the operations in block 550 may include the processor (e.g., 210, 212, 214, 216, 218, 252, 260).

The processor may then use the shared key to protect communications between the UE and the second UE via the non-IMS media communication link in block 504 of the method 500a as described.

Figure 6:
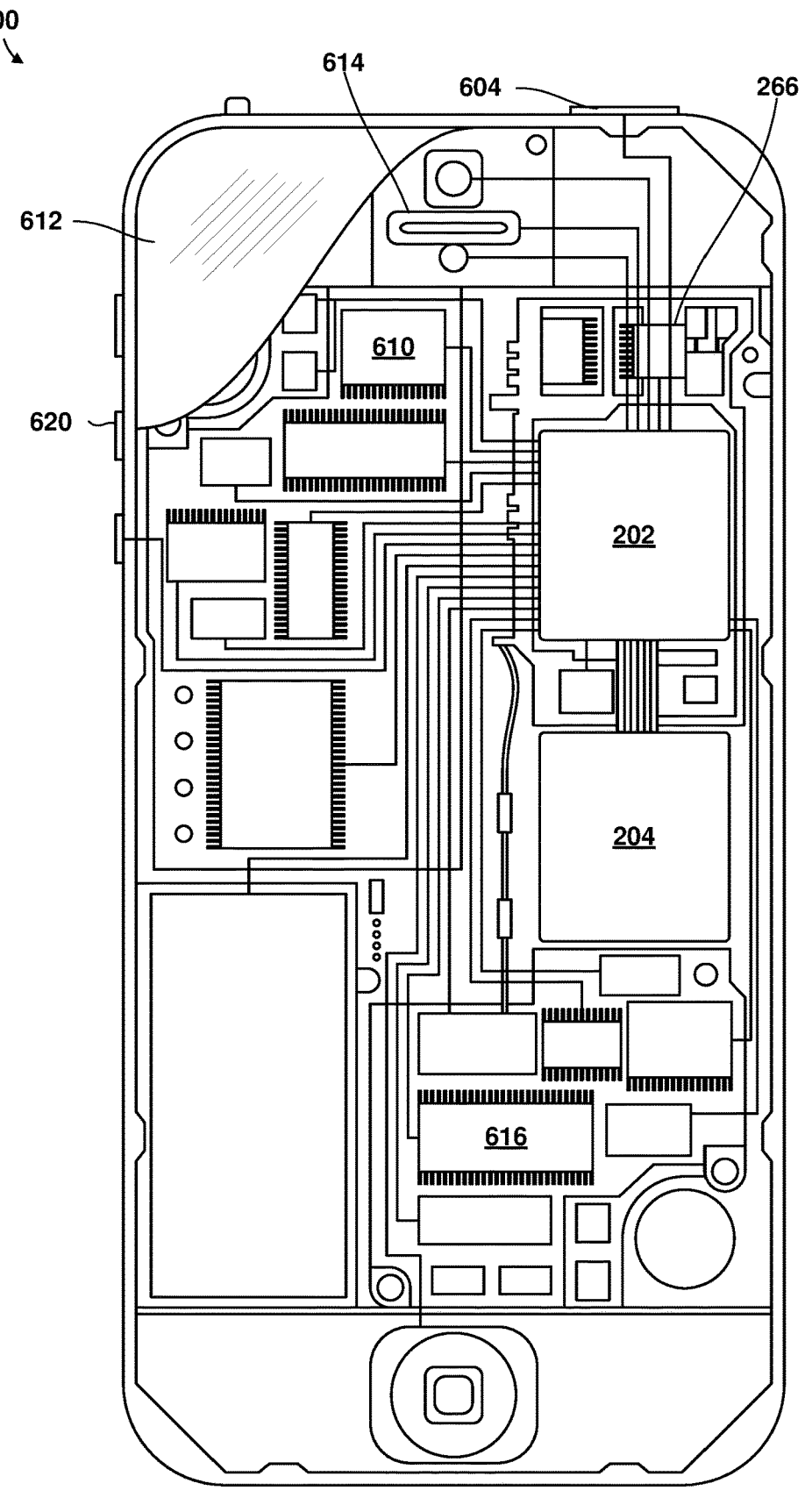
FIG. 6 is a component block diagram of a UE suitable for use with various embodiments.

FIG. 6 is a component block diagram of a UE 600 suitable for use with various embodiments. With reference to FIGS. 1A-6, various embodiments may be implemented on a variety of UEs 600 (for example, the UEs 120a-120e, 200, 320, 402, 404), an example of which is illustrated in FIG. 6 in the form of a smartphone. The UE 600 may include a first SOC 202 (for example, a SOC-CPU) coupled to a second SOC 204 (for example, a 5G capable SOC). The first and second SOCs 202, 204 may be coupled to internal memory 616, a display 612, and to a speaker 614. Additionally, the UE 600 may include an antenna 604 for sending and receiving electromagnetic radiation that may be connected to a wireless transceiver 266 coupled to one or more processors in the first and/or second SOCs 202, 204. The UE 600 may include menu selection buttons or rocker switches 620 for receiving user inputs. The UE 600 may include a sound encoding/decoding (CODEC) circuit 610, which digitizes sound received from a microphone into data packets suitable for wireless transmission and decodes received sound data packets to generate analog signals that are provided to the speaker to generate sound. One or more of the processors in the first and second SOCs 202, 204, wireless transceiver 266 and CODEC 610 may include a digital signal processor (DSP) circuit (not shown separately).

Figure 7:
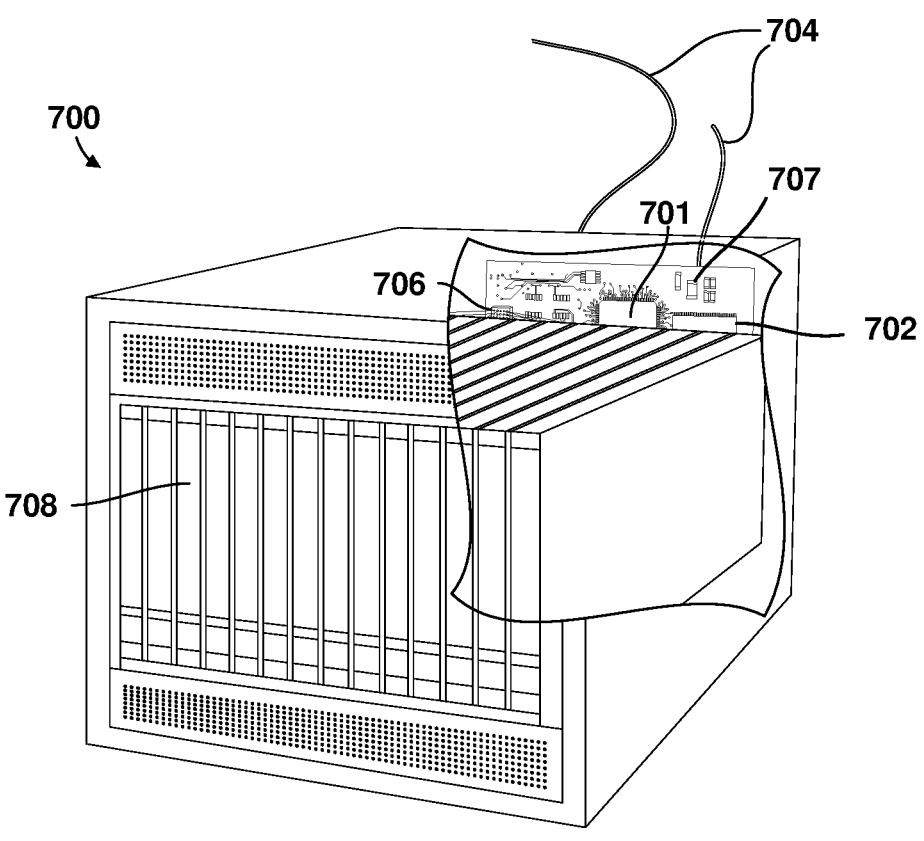
FIG. 7 is a component block diagram of a network device suitable for use with various embodiments.

FIG. 7 is a component block diagram of a network device suitable for use with various embodiments. Such network devices (e.g., network device 110a-110d, 350, 406, 410, 414) may include at least the components illustrated in FIG. 7. With reference to FIGS. 1A-7, the network device 700 may typically include a processor 701 coupled to volatile memory 702 and a large capacity nonvolatile memory, such as a disk drive 708. The network device 700 also may include a peripheral memory access device 706 such as a floppy disc drive, compact disc (CD) or digital video disc (DVD) drive coupled to the processor 701. The network device 700 also may include network access ports 704 (or interfaces) coupled to the processor 701 for establishing data connections with a network, such as the Internet or a local area network coupled to other system computers and servers. The network device 700 may include one or more antennas 707 for sending and receiving electromagnetic radiation that may be connected to a wireless communication link. The network device 700 may include additional access ports, such as USB, Firewire, Thunderbolt, and the like for coupling to peripherals, external memory, or other devices.

The processors of the UE 600 and the network device 700 may be any programmable microprocessor, microcomputer or multiple processor chip or chips that can be configured by software instructions (applications) to perform a variety of functions, including the functions of some implementations described below. In some wireless devices, multiple processors may be provided, such as one processor within an SOC 204 dedicated to wireless communication functions and one processor within an SOC 202 dedicated to running other applications. Software applications may be stored in the memory 616, 702 before they are accessed and loaded into the processor. The processors may include internal memory sufficient to store the application software instructions.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations 500*a*-500*f* may be substituted for or combined with one or more operations of the methods and operations 500*a*-500*f*.

Implementation examples are described in the following paragraphs. While some of the following implementation examples are described in terms of example methods, further example implementations may include: the example methods discussed in the following paragraphs implemented by a UE including a processor configured with processor-executable instructions to perform operations of the methods of the following implementation examples; the example methods discussed in the following paragraphs implemented by a UE including means for performing functions of the methods of the following implementation examples; and the example methods discussed in the following paragraphs may be implemented as a non-transitory processor-readable storage medium having stored thereon processor-executable instructions configured to cause a processor of a UE to perform the operations of the methods of the following implementation examples.

Example 1. A method performed by a processor of a user equipment (UE) for securing media stream communications involving an Internet Protocol Multimedia Subsystem (IMS) media communication link and a non-IMS media communication link, including establishing a shared key between the UE and a second UE via the IMS media communication link, and using the shared key to protect communications between the UE and the second UE via the non-IMS media communication link.

Example 2. The method of example 1, in which the IMS media communication link includes a cellular communication link.

Example 3. The method of either of examples 1 and 2, in which the non-IMS media communication link includes a Wi-Fi communication link.

Example 4. The method of any of examples 1-3, in which using the shared key to protect communications between the UE and the second UE via the non-IMS media communication link includes using the shared key to encrypt communications that are sent between the UE and the second UE via the IMS media communication link, and sending the encrypted communications between the UE and the second UE via the non-IMS media communication link.

Example 5. The method of any of examples 1-4, in which using the shared key to protect communications between the UE and the second UE via the non-IMS media communication link includes using the shared key as a master key to generate one or more encryption keys, and using the generated one or more encryption keys to protect communications between the UE and the second UE via the non-IMS media communication link.

Example 6. The method of any of examples 1-5, in which establishing a shared key between the UE and the second UE via the IMS media communication link includes determining whether a previously established shared key can be used to protect the communications between the UE and the second UE via the non-IMS media communication link, establishing the shared key between the UE and the second UE via an IMS media communication link in response to determining that the previously established shared key cannot be used to protect the communications between the UE and the second UE via the non-IMS media communication link, and using the previously established shared key to protect communications between the UE and the second UE via the non-IMS media communication link in response to determining that the previously established shared key can be used to protect the communications between the UE and the second UE via the non-IMS media communication link.

Example 7. The method of any of examples 1-6, further including sending a hash verification message between the UE and the second UE via the IMS media communication link, in which the hash verification message is configured to enable the second UE to verify the shared key.

Example 8. The method of any of examples 1-7, in which establishing the shared key between the UE and the second UE via the IMS media communication link includes applying a Session Initiation Protocol (SIP) value known to the UE and the second UE to generate the shared key.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a user equipment (UE) for securing media stream communications involving an Internet Protocol Multimedia Subsystem (IMS) media communication link and a non-IMS media communication link, comprising:

establishing, between the UE and a second UE, the IMS media communication link and the non-IMS media communication link, wherein the IMS media communication link uses a previously established shared key;

determining that the previously established shared key cannot be used to protect communications between the UE and the second UE via the non-IMS media communication link;

establishing, in response to the determination, a shared key directly between the UE and the second UE via the IMS media communication link based on applying a first Session Initiation Protocol (SIP) value at the UE and applying a second SIP value at the second UE, wherein the first SIP value and the second SIP value are known to the UE and the second UE;

encrypting, using the shared key, first communications between the UE and the second UE via the non-IMS media communication link as encrypted communications; and sending the encrypted communications between the UE and the second UE via the non-IMS media communication link.

2. The method of claim 1, wherein the IMS media communication link includes a cellular communication link and wherein the non-IMS media communication link includes a Wi-Fi communication link.

3. The method of claim 1, wherein the UE and the second UE verify the shared key using independently generated hash values exchanged via the IMS media communication link.

4. The method of claim 1, wherein encrypting, using the shared key first communications between the UE and the second UE via the non-IMS media communication link comprises:

using the shared key as a master key to generate one or more encryption keys; and using the generated one or more encryption keys to protect communications between the UE and the second UE via the non-IMS media communication link.

5. The method of claim 1, further comprising:

determining an additional previously established shared key can be used to protect communications between the UE and a third UE via an additional non-IMS media communication link; and using the previously established shared key to protect communications between the UE and the third UE via the additional non-IMS media communication link in response to determining that the additional previously established shared key can be used to protect the communications between the UE and the third UE via the additional non-IMS media communication link.

6. The method of claim 1, further comprising sending a hash verification message between the UE and the second UE via the IMS media communication link, wherein the hash verification message is configured to enable the second UE to verify the shared key.

7. The method of claim 1, further comprising:

generating, at the first UE, a first hash value of the shared key and generating, at the second UE, a second hash value of the shared key;

transmitting the first hash value via the IMS media communication link from the first UE to the second UE; and

verifying, at the second UE, the first hash value against the second hash value.

8. A user equipment (UE), comprising:

a memory; and a processor coupled to the memory, wherein the processor is configured with processor-executable instructions to:

establishing, between the UE and a second UE, an Internet Protocol Multimedia Subsystem (IMS) media communication link and a non-IMS media communication link, wherein the IMS media communication link uses a previously established shared key;

determine that the previously established shared key cannot be used to protect communications between the UE and the second UE via a non-IMS media communication link;

establish, in response to the determination, a shared key directly between the UE and the second UE via the IMS media communication link based on applying a first Session Initiation Protocol (SIP) value at the UE and applying a second SIP value at the second UE, wherein the first SIP value and the second SIP value are known to the UE and the second UE;

encrypt, using the shared key, first communications between the UE and the second UE via a non-IMS media communication link as encrypted communications; and send the encrypted communications between the UE and the second UE via the non-IMS media communication link.

9. The UE of claim 8, wherein the IMS media communication link includes a cellular communication link and wherein the non-IMS media communication link includes a Wi-Fi communication link.

10. The UE of claim 8, wherein the UE and the second UE verify the shared key using independently generated hash values exchanged via the IMS media communication link.

11. The UE of claim 8, wherein the processor is further configured with processor-executable instructions to use the shared key to protect communications between the UE and the second UE via the non-IMS media communication link by:

using the shared key as a master key to generate one or more encryption keys; and using the generated one or more encryption keys to protect communications between the UE and the second UE via the non-IMS media communication link.

12. The UE of claim 8, wherein the processor is further configured with processor-executable instructions to establish a shared key between the UE and the second UE via the IMS media communication link by:

determining an additional a previously established shared key can be used to protect the communications between the UE and a third UE via an additional non-IMS media communication link; and using the previously established shared key to protect communications between the UE and the third UE via the additional non-IMS media communication link in response to determining that the additional previously established shared key can be used to protect the communications between the UE and the third UE via the additional non-IMS media communication link.

13. The UE of claim 8, wherein the processor is further configured with processor-executable instructions to send a hash verification message between the UE and the second UE via the IMS media communication link, wherein the hash verification message is configured to enable the second UE to verify the shared key.

14. A non-transitory processor-readable medium having stored thereon processor-executable instructions configured to cause a processing device in a user equipment (UE) to perform operations comprising:

establishing, between the UE and a second UE, a IMS media communication link and a non-IMS media communication link, wherein the IMS media communication link uses a previously established shared key;

determining that the previously established shared key cannot be used to protect communications between the UE and a second UE via a non-IMS media communication link;

establishing, in response to the determination, a shared key directly between the UE and the second UE via an IMS media communication link based on applying a first Session Initiation Protocol (SIP) value at the UE and applying a second SIP value at the second UE, wherein the first SIP value and the second SIP value are known to the UE and the second UE;

encrypting, using the shared key, first communications between the UE and the second UE via a media communication link as encrypted communications; and sending the encrypted communications between the UE and the second UE via the non-IMS media communication link.

15. The non-transitory processor-readable medium of claim 14, wherein the stored processor-executable instructions are further configured such that the IMS media communication link includes a cellular communication link and wherein the stored processor-executable instructions are further configured such that the non-IMS media communication link includes a Wi-Fi communication link.

16. The non-transitory processor-readable medium of claim 14, wherein the UE and the second UE verify the shared key using independently generated hash values exchanged via the IMS media communication link.

17. The non-transitory processor-readable medium of claim 14, wherein the stored processor-executable instructions are further configured such that encrypting, using the shared key, first communications between the UE and the second UE via the non-IMS media communication link comprises:

using the shared key as a master key to generate one or more encryption keys; and using the generated one or more encryption keys to protect communications between the UE and the second UE via the non-IMS media communication link.

18. The non-transitory processor-readable medium of claim 14, wherein the stored processor-executable instructions are further configured such that establishing a shared key between the UE and the second UE via the IMS media communication link comprises:

determining an additional previously established shared key can be used to protect the communications between the UE and a third UE via an additional non-IMS media communication link; and using the previously established shared key to protect communications between the UE and the third UE via the additional non-IMS media communication link in response to determining that the additional previously established shared key can be used to protect the communications between the UE and the third UE via the additional non-IMS media communication link.

\* \* \* \* \*